3,127,325
REACTOR WITH PROMPT NEGATIVE TEMPERATURE COEFFICIENT AND FUEL ELEMENT THEREFOR
Theodore Brewster Taylor and Andrew Wetherbee McReynolds, La Jolla, Calif., and Freeman John Dyson, Princeton, N.J., assignors to General Dynamics Corporation, New York, N.Y., a corporation of Delaware
Filed May 9, 1958, Ser. No. 732,415
6 Claims. (Cl. 176—62)

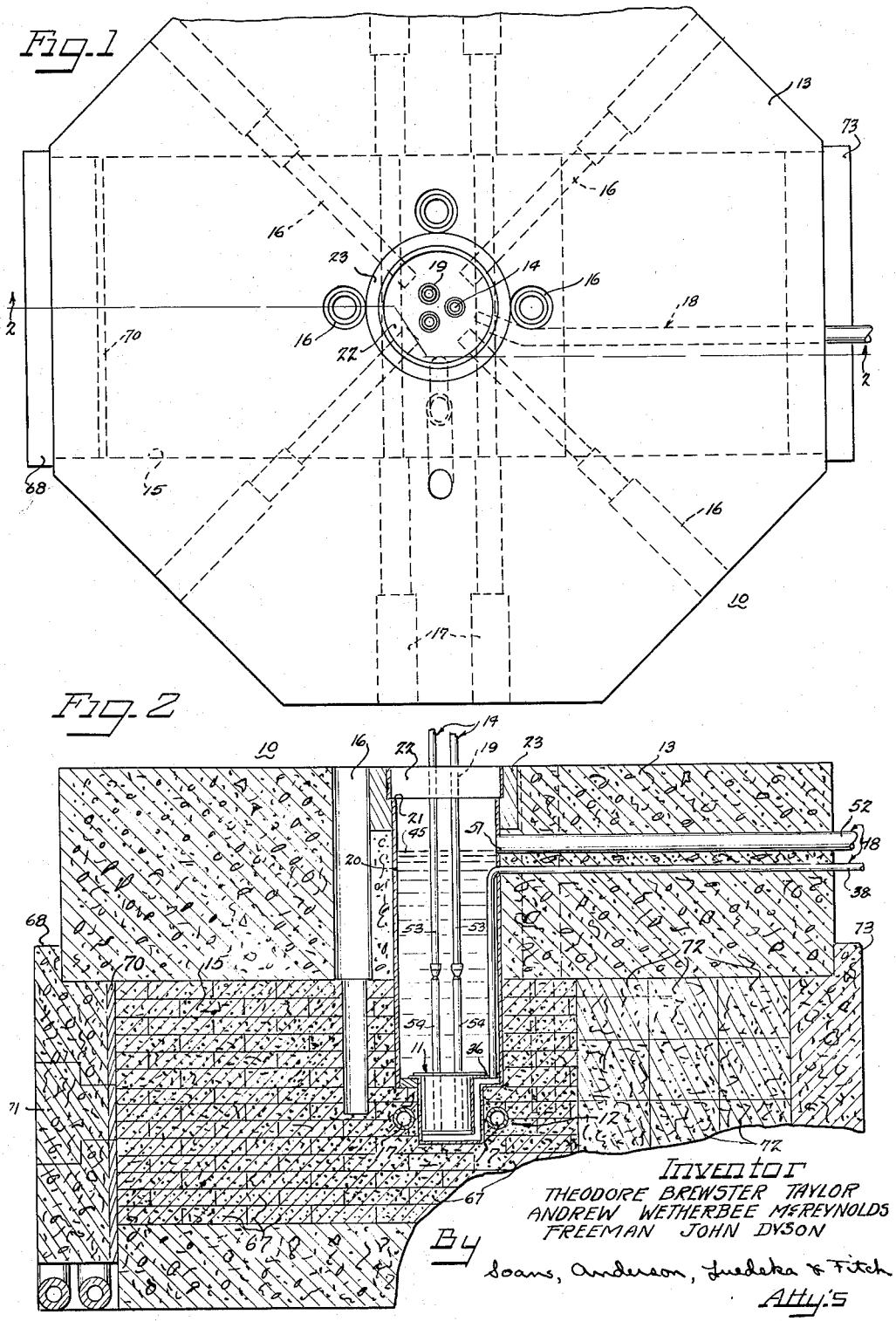

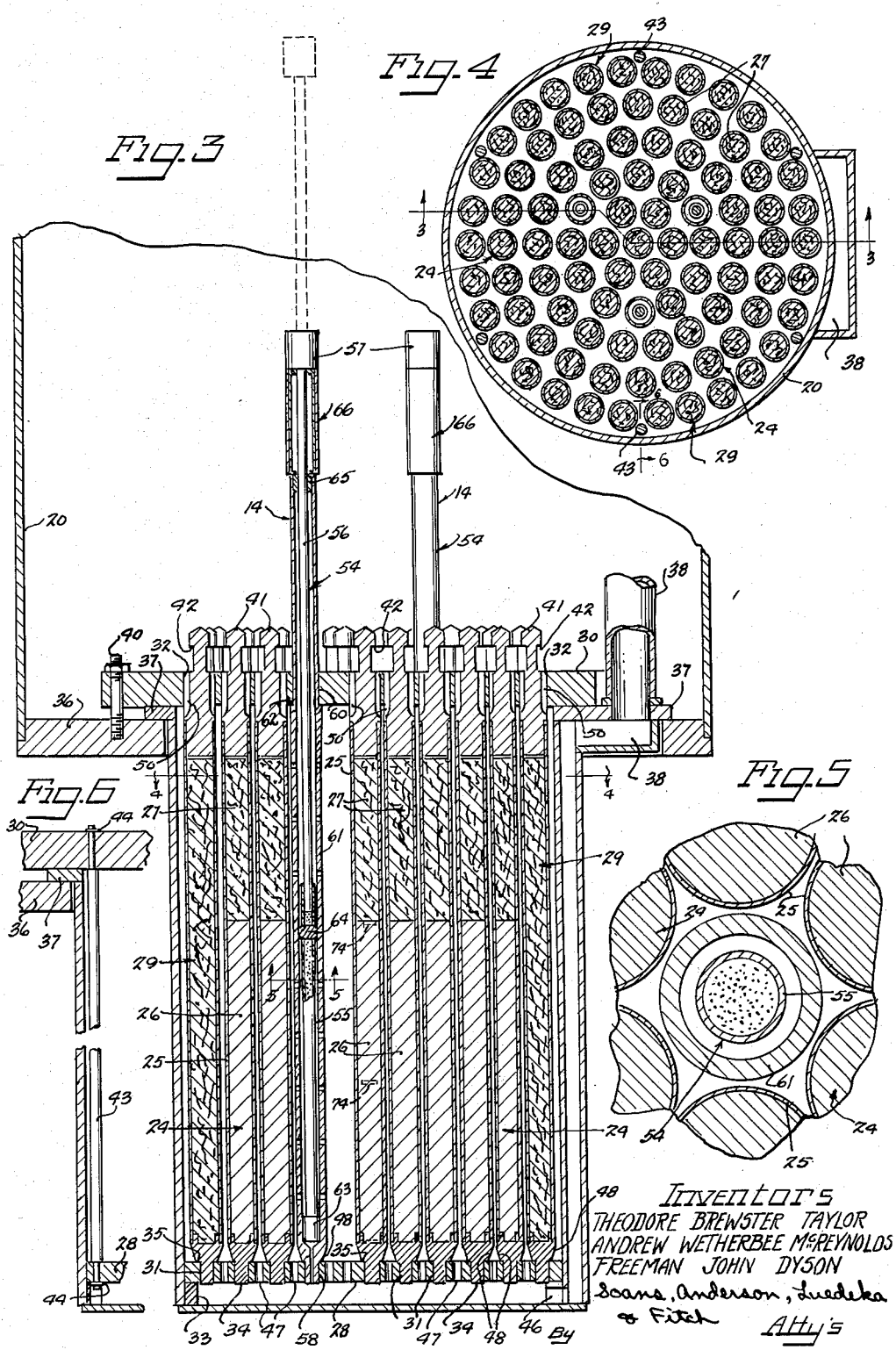

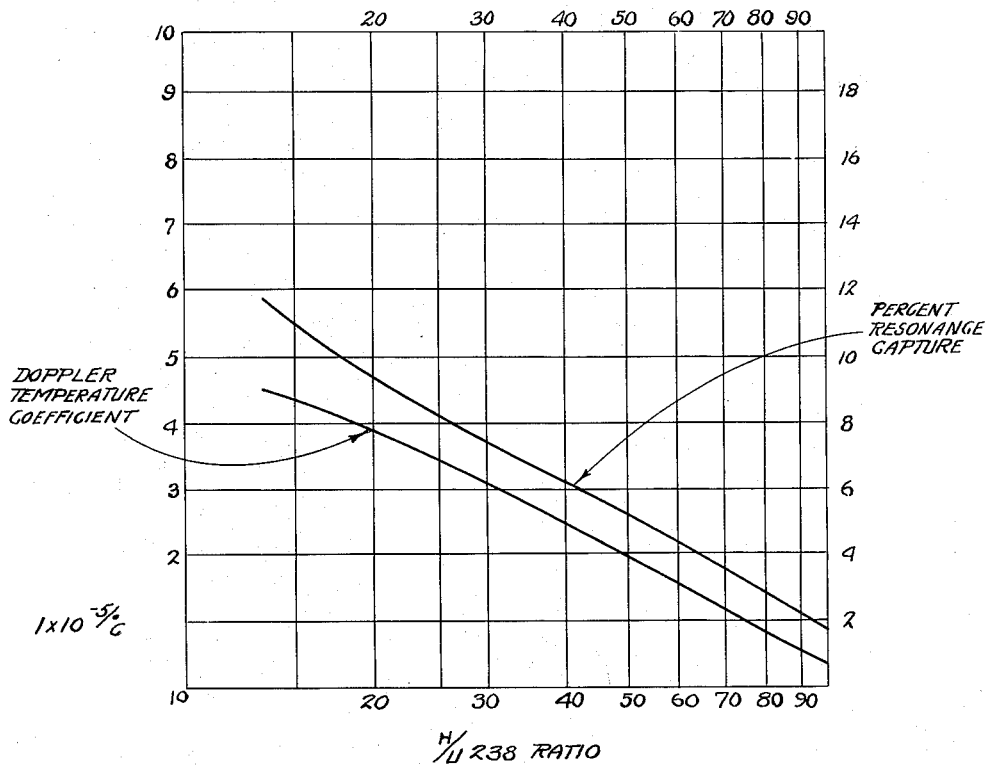
RESONANCE CAPTURE AND DOPPLER TEMPERATURE
COEFFICIENT AS FUNCTION OF U 238 CONCENTRATION United States Patent Office 3,127,325
Patented Mar. 31, 1964

The present invention relates generally to neutronic reactors and more particularly to an improved neutronic reactor having a prompt negative temperature coefficient of reactivity.

As is now well known, by massing together sufficient fissionable material under appropriate conditions, a neutron reactive system may be formed, which system, by reason of its ability to generate neutrons at an equal or greater rate than they are being lost to the system as a result of absorption in the system or leakage from the system, is capable of maintaining a self-sustained chain reaction of neutron induced fission. Such a system has been termed a neutronic reactor or "pile."

A neutronic reactor generally includes an active core containing a moderator and a fuel containing fissionable material, and a reflector to conserve escaping neutrons, together with provision for heat removal and measuring and control elements. In a neutronic reactor, fast neutrons are produced in the fission process. These neutrons may suffer scattering collisions, mainly elastic, as a result of which their energy is decreased; they may be absorbed by the various materials present in the system; or, they may escape. Depending upon the relative amounts and nature of the fuel, moderator, reflector and other substances, their geometrical arrangement and the dimensions of the system, the main portion of the neutron captures leading to fission will take place in a certain energy range. If most of the fissions result from the capture of thermal neutrons, the system is referred to as a "thermal reactor." If most of the fission processes are due to absorption of neutrons of an energy in an intermediate range, the system is termed an "intermediate reactor," and finally, if the main source of fissions is caused by the capture of fast neutrons, the system is termed a "fast reactor." A detailed description of the theory and practice of the design, construction and operation of reactors generally is set forth in various patents and books, and will therefore not be referred to in detail herein. For example, see "The Elements of Nuclear Theory," by Glasstone and Edlund, published 1952 by Van Nostrand Company, Inc.

To sustain a chain reaction, each nucleus in the reactor which captures a neutron and undergoes fission must produce, on the average, at least one neutron which causes fission of another nucleus in the reactor. It has been found convenient to express this condition in terms of an effective multiplication or reproduction factor $K_{eff}$, defined as the ratio of the number of neutrons produced by fission in each generation to the total number of corresponding neutrons absorbed by the fuel, moderator, etc., or leaking out, on the average. The critical condition is that $K_{eff}$ shall be exact unity. When $K_{eff}$ is equal to one, a chain reaction will be maintained at a constant rate of fission and power level. If $K_{eff}$ for a reactor exceeds one, the system is said to be supercritical, and if less than one, the system is said to be subcritical.

In discussing the characteristics of a neutronic reactor, it is convenient to introduce a further quantity $\rho$, called the reactivity, defined by the relationship $$\rho = \frac{K_{eff} - 1}{K_{eff}}$$

Reactors may also be classified according to the physical condition of the fuel, as either a "heterogeneous reactor" or as a "homogeneous reactor." In a "heterogeneous reactor," bodies of fissionable material or fuel are distributed or arranged in a pattern throughout the moderator. The fuel is generally in the form of discrete lumps which are surrounded by moderator material. In a "homogeneous reactor," the fissionable material and the moderator are combined in a mixture, such that an effective homogeneous medium is presented to the neutrons. Such a mixture may be either a solution of fuel and moderator or a solid mixture of particles of the fuel and of the moderator.

The rate of construction of neutronic reactors has increased markedly during recent years, and it appears that this increased activity will continue in the future. Reactors have now been made and are being made for use for the various medical and physical research institutes, industry and the Government. In many cases, reactors are now being used in teaching or research, where the reactors are constantly operated by changing personnel. It has therefore become increasingly imperative to provide reactors which are so designed that they may be used by persons who are not reactor experts without fear of major accidents.

The worst conceivable mishandling of a reactor consists of instantaneously introducing all of the available excess reactivity $\rho$ into the reactor. For a reactor operating at a moderate power level, such as might be used for teaching or general research purposes, one need not provide an excess reactivity of more than about 1.0 percent. One could provide a safe reactor for such purposes if the reactor could be designed so that a sudden rise in reactivity of 1.0 percent would not cause damage to the reactor. With other reactors, such as a medical or general purpose experimental reactor working at a high power level, a much larger amount of maximum excess reactivity is needed. Although it would be desirable to design a high power level reactor which could withstand the sudden addition of all of its excess reactivity without incurring damage, if this condition could not be met, it would still be desirable to provide a reactor which would not be damaged by a reasonable surge of excess reactivity into the system.

In a nuclear reactor, a considerable amount of energy is released in the form of heat and, although some form of heat transfer mechanism is generally used to cool the reactor, the temperature will inevitably experience variations during operation. A change in temperature will affect the reactivity for at least two reasons. First, the mean energy of the thermal neutrons will change and, since nuclear absorption cross sections vary with energy, their absorption will be affected; second, the mean free paths and leakage probabilities will change, since they are functions of the density of the system which changes with temperature. If the reactivity of a reactor decreases with increasing temperature, it is said to have a negative temperature coefficient of reactivity, and if the reactivity of a reactor increases with increasing temperature, it is said to have a positive temperature coefficient of reactivity.

It has been suggested that one might be able to make a safe reactor if one could provide a reactor with a sufficient prompt negative temperature coefficient of reactivity to take care of a sudden surge of all of the available excess reactivity into the system. By a "prompt" temperature coefficient is meant one which does not require the flow of heat from one region to another in order for it to come into play.

Of the various types of reactors, a solid "homogeneous" reactor appears to be the most suitable or adaptable for forming a generally safe reactor with a prompt negative temperature coefficient of reactivity. In such a reactor, the internal moderator temperature will generally rise instantaneously when the reactor power increases. Such a reactor is not subject to the limitations of a "homogenous" reactor formed with a liquid fuel moderator. Although these latter reactors are inherently safe, since a sudden rise of reactivity causes the liquid to boil, thereby limiting the reaction, they require chemical control, and they generally cannot be handled without a staff of experienced reactor operators. In addition, such reactors provide difficulties due to the radioactive and corrosive nature of the reactive solution, and the release of fissionable gases produced by fission and chemical decomposition.

The primary object of the present invention is to provide an improved neutronic reactor which will not be destroyed even if grossly mishandled. Further objects of the present invention are to provide an improved neutronic reactor having a prompt negative temperature coefficient of reactivity such that the reactor has exceptional safety characteristics; to provide an improved neutronic reactor which is easy to control, and which has a large enough amount of excess reactivity so that the reactor is adaptable for a wide variety of uses; and to provide an improved neutronic reactor which can be constructed at reasonable cost, which can be operated without danger to the operating personnel, and which has a long core life so that the reactor may be suitably operated on a continuous basis over extended periods of time without breakdown or other difficulties.

Other objects and advantages of the present invention will be clearly apparent from the following description and the accompanying drawings, wherein a selected embodiment of the invention is illustrated.

In the drawings:

FIGURE 1 is a plan view of a reactor constructed in accordance with the present invention;

FIGURE 2 is a sectional view of the reactor taken along the line 2—2 of FIGURE 1;

FIGURE 3 is an enlarged partial view in cross-sectional elevation of the central core portion of the reactor of FIGURE 1;

FIGURE 4 is a sectional plan view taken along the line 4—4 of FIGURE 3;

FIGURE 5 is an enlarged sectional view taken along the line 5—5 of FIGURE 3;

FIGURE 6 is a sectional view taken along line 6—6 of FIGURE 4; and

FIGURE 7 is a graph showing the variation of the contribution to the temperature coefficient of reactivity with the concentration of a material having a large number of strong, narrow resonance bands at energies above thermal in the fuel elements of a reactor constructed in accordance with the present invention.

As indicated above, a reactor constructed in accordance with the present invention is capable of sustaining a power surge resulting from sudden addition of all or a major part of the available excess reactivity without resulting damage to the reactor. This safety feature is achieved by suitably designing the reactor so that it has a sufficiently high prompt negative temperature coefficient of reactivity.

The neutrons within a reactor are normally in equilibrium with the moderating material. Although the adjustment of the neutron temperature to the temperature of the moderator occurs very rapidly, and for our purposes may be considered as occurring essentially instantaneously, the response of the moderator to the reactor power level is not necessarily fast. Indeed, in a "heterogeneous" reactor in which the fuel elements are distributed in a definite pattern in the moderator, the response is quite slow, because the independent heat-transfer behavior of the fuel and moderator causes a lag between the induced heat transient in the fuel and the dampening effect of a general temperature rise in the entire core. This lag can result in a melt-down of the fuel or even an explosion of the reactor. On the other hand, in a "homogeneous" reactor, in which the fuel material is more or less evenly dispersed throughout the moderator, the response is essentially instantaneous. In the present reactor we take advantage of this latter characteristic by forming fuel elements which include a homogeneous mixture of a solid moderator and a material fissionable by neutrons of thermal energy such as uranium 235 or plutonium 239.

The core of the present reactor is preferably formed of a plurality of spaced fuel elements which are suitably cooled by a fluid, either a gas or a liquid, flowing past the fuel elements. It should be understood, however, that it is possible to incorporate the basic features of the present invention in a solid "homogeneous" type reactor, which has a solidly packed uncooled core.

A high prompt negative temperature coefficient of reactivity is obtained in the present reactor by suitably designing the reactor so that a significant contribution to the negative temperature coefficient of reactivity is obtained from the "fuel element expansion effect," the "warm neutron effect," the "leakage effect" and also from the "neutron Doppler effect." A further contribution to the prompt negative temperature coefficient of reactivity may be obtained by the controlled utilization of "poisons" in the reactor.

If the reactivity of the reactor is increased the power level of the reactor will rise, causing the fuel elements to become hotter. As the temperature of the fuel elements increases the fuel elements will expand in size, forcing a portion of the cooling water to leave the core of the reactor thereby decreasing the hydrogen density in the core. This will result in an increased leakage of fast neutrons from the core and a decreasing reactivity of the system. This effect is referred to as the "fuel element expansion effect."

The "warm neutron effect" and "leakage effect" operate in the following manner: Suppose the reactivity of the reactor is suddenly increased. Then the fuel and the internal moderator, i.e., the solid moderator which is intimately intermixed with the fuel, become hotter and the neutrons within the fuel elements are thereby warmed up. Because of the rise of the average neutron energy, the fission cross section of the fuel is decreased, resulting in a decreased absorption of neutrons in the fuel. A larger proportion of the neutrons escape from the fuel element into the external moderator and a smaller proportion are available for fission. On the other hand, the neutrons which do arrive in the external moderator are rapidly cooled and are then absorbed with a fixed probability independent of the fuel temperature. The differential absorption of neutrons is referred to as the "warm neutron effect." The increased leakage of neutrons from the core and reflector is referred to as the "leakage effect." The net effect is that a higher proportion of neutrons are captured in the external moderator or pass out of the system, and the reactivity of the system is lowered.

By including in the homogeneous mixture of the fuel elements a suitable amount of material having a large number of strong, narrow resonance bands at energies above thermal, one can effect a further significant contribution to the prompt negative temperature coefficient of reactivity. Because the kinetic energy of the nuclei increases with increasing temperature, the width of each of the resonance bands increases with temperature. Since the resonance absorption cross sections are large, essentially all of the neutrons having energies which fall within the widths of the various individual resonance bands in the resonance region are captured. The widening of the resonance bands therefore results in a decrease in the resonance escape probability, notwithstanding the fact that the heights of the resonance peaks are somewhat decreased. The broadening of the resonance bands is generally referred to as the "neutron Doppler effect." While the "neutron Doppler effect" itself is well known, it has been believed that this effect could not provide a sufficient contribution to the temperature coefficient of reactivity in a reactor to play a substantial role in the construction of a safe reactor. We have now found that when a sufficient amount of material having a large number of strong resonance bands at energies above thermal is uniformly dispersed within the fuel elements of a solid "homogeneous" type reactor, so that the amount of resonance absorption is greater than about 3 percent, there will be a significant "Doppler" contribution to the negative temperature coefficient of reactivity of the reactor.

The reactor may also include a material having a high neutron capture cross section distributed in the reactor in a manner such that the absorption of neutrons by this material relative to the absorption of neutrons by the fissionable material increases with increasing temperature. Since the fission cross section of uranium decreases uniformly with neutron temperature, this may be accomplished by the homogeneous distribution of an absorber such as cadmium or samarium for which the capture cross-section increases with neutron temperature because of nearby resonances. It may also be accomplished by the distribution of any strong absorber in individual amounts sufficient to be essentially opaque to thermal neutrons, thus giving absorption independent of neutron temperature. Such materials may be termed "poisons" and may be added either to the fuel element or to the reflector. We have discovered that a moderate amount of "poison" may be used in a reactor without requiring an unduly large increase in the amount of fuel or size and cost of the reactor, while at the same time providing a large contribution to the prompt negative temperature coefficient of the reactor. We have further discovered that the "poison" may be so arranged that its rate of consumption partly balances the rate of consumption of fissionable material and thereby prolongs the useful life of the fuel elements.

Other effects which contribute to the negative temperature coefficient of reactivity will also be present in the reactor. However, such other effects do not play an important part in the design of the present reactor. We may include in these further effects the temperature coefficient of coolant expansion, and the effect of neutron temperature on the capture-to-fission ratio of fuel. Since these effects are relatively minor in nature, they will not be further discussed. Complete information on these effects may be obtained from the literature on the reactor theory.

Referring to the accompanying drawings, there is illustrated a research reactor 10 formed in accordance with the present invention. This reactor is designed to operate at power levels up to about 10 kilowatts at a normal average operating temperature of about 40° C. At the 10 kilowatt level this reactor will provide an average core thermal flux of about $10^{11}$ neutrons per square centimeter per second. An excess reactivity of about 1.0 percent to about 1.5 percent is provided to take care of fuel burn up and accumulation of poisons produced during the operation of the reactor. This reactor was chosen for reasons of simplicity of design and control. However, it should be realized that the principles of the present invention are applicable to reactors which operate at a much higher power level and which require a greater reserve of excess reactivity than are required by a 10 kilowatt research reactor. As will be hereinafter seen, the illustrated research reactor is provided with an inherent, high prompt negative temperature coefficient of reactivity such that it will not be damaged even if all of the excess reactivity is suddenly added to the reactor.

Referring now particularly to FIGURES 1 and 2, the reactor includes a central core assembly 11, surrounding reflector 12, external shielding 13, suitable control means including safety and/or control rods 14, as well as the usual experimental facilities such as a thermal column 15, access ports 16, and through tubes 17, and suitable means 18 for removing heat from the system.

The core assembly 11 is located in the lower end portion of a vertically extending reactor tank 20. This tank is formed of material such as aluminum which has suitable structural strength, which is resistant to corrosion by the coolant which is employed, and which has a low capture cross section for neutrons so as to allow substantially free passage of neutrons therethrough.

The reactor tank 20 is generally cylindrical in form. Its lower end portion which contains the core assembly is of reduced diameter. The upper end of the reactor tank is of slightly enlarged diameter, thereby providing a lower shoulder 21 which supports a cover member 22 formed of suitable radiation absorbing material such as lead to reduce the radiation at the upper end of the tank to a safe level. A structural supporting ring 23 of steel or similar high strength material surrounds the upper end of the reactor tank so as to provide additional strength to the upper section of the tank.

The cover 22 has an outside diameter approximately equal to the inside diameter of the upper portion of the tank 20 for slidable engagement therewith. The cover 22 has a vertical height which is approximately equal to that of the upper, enlarged diameter portion of the tank so that its upper end is approximately flush with the upper edge of the tank. Suitable openings 19 are provided through the cover which accommodate control rods 14 as hereinafter described.

Within the lower portion of the reactor tank are a plurality of vertically extending fuel elements 24 positioned in predetermined spaced relation to each other. Each of the fuel elements is formed of an elongated, closed cylindrical tube 25 the lower portion of which is filled with a solid body 26 formed of a homogeneous mixture of a material fissionable by neutrons of thermal energy such as uranium 233, uranium 235 or plutonium 239, a solid moderator such as beryllium, beryllium oxide, zirconium hydride or carbon, and a material having a large number of strong resonance bands at energies above thermal such as uranium 238 or thorium 232. As will be hereinafter seen, the concentration of resonance absorbing material in the fuel elements should be such that the amount of resonance absorption in the system is greater than about 3 percent. The upper portions of the fuel elements 24 preferably contain a suitable reflecting material 27 such as beryllium, beryllium oxide or carbon. The outer tubes or "cladding" of the fuel elements are formed of material such as aluminum which, as previously pointed out, is resistant to corrosion and has a low neutron capture cross section.

As seen in FIGURES 3 and 4, the fuel elements 24 extend in a generally vertical direction and are positioned in uniformly spaced concentric circles with the fuel elements in each circle spaced an equal distance from adjacent fuel elements in the same circle. The illustrated reactor includes 57 such elements. However, it should be understood that the number of fuel elements will vary considerably, depending upon the specific composition of the fuel elements as well as the general design and dimensions of the reactor and particular arrangement of the fuel elements.

The fuel elements 24 are suitably maintained in the desired spaced relation within the lower end of the reactor tank 20 by means of a pair of vertically spaced, transversely extending perforated plates or grid members 28 and 30. The grid members, like the various other structural members disposed within the reactor tank, are preferably formed of a non-corrosive material having a low neutron capture cross-section, such as aluminum. The grid members 28 and 30 are vertically spaced apart a distance slightly less than the height of the fuel elements 24, and are provided with suitably aligned openings 31 and 32 which slidably engage and support the fuel elements.

The disclosed grid members 28 and 30 are provided with a larger number of available openings or fuel element positions than that necessary to meet the operating requirements of the reactor. The unused positions are occupied by dummy elements 29 in which the fuel is replaced by a suitable scattering material having a low neutron absorption cross section such as graphite.

The lower grid member 28 is supported a short distance above the bottom of the reactor tank by means of a suitable aluminum spacer collar 33. The fuel elements 24 have lower end portions 34 which slidably engage the openings 31 in the lower grid member 28, and which provide shoulder portions 35 which engage the upper surface of the lower grid member 28 adjacent the openings 31.

The upper grid member 30 is supported within the reactor tank 20 by the shoulder 36 formed at the juncture of the main body of the reactor tank with the lower portion of the tank which is of reduced diameter. As seen in FIGURE 3, the upper grid member 30 is spaced upwardly from the shoulder by a spacer member 37, to facilitate the construction of a coolant inlet 38 for the reactor tank 20. The upper grid member 30 has an outside diameter substantially larger than the outside diameter of the reduced lower portion of the reactor tank 25 and is affixed to the shoulder 36 of the tank by suitable bolts 40. The openings 32 in the upper grid member 30 have a diameter approximately equal to the outer diameter of the fuel elements 24, so that the fuel elements can be slidably inserted therethrough for positioning within the reactor core. The upper portion of each of the fuel elements 24 extends above the upper grid member 30 and has a head portion 41 which is suitably undercut to provide a lip or downwardly facing shoulder 42 which is engageable by a co-acting pickup means (not shown) for vertically removing the fuel elements 24 from the reactor core.

A plurality of spacer rods 43 interconnect the upper and lower grid members 28 and 30. As seen in FIGURE 6, the spacer rods 43 have end portions of reduced diameter which extend through suitable openings in the grid members 28 and 30 and are secured in position by headed screws 44 or the like.

In addition to the various requirements above noted, the composition of the fuel elements should be such that the fuel elements may be effectively utilized in the reactor for an extended period of time. To satisfy this condition, the solid moderator used in the fuel element should be stable against radiation damage at fluxes in excess of $10^{10}$ neutrons per square centimeter per second over extended periods of time, and against melting and chemical decomposition at temperatures up to at least 300° C. A particularly satisfactory fuel element, in accordance with the present invention, may be formed with an active portion comprising a homogeneous mixture of enriched uranium (approximately 20 percent uranium 235) and zirconium hydride, in which the hydrogen atom to zirconium atom ratio is about 1.0:1, and the hydrogen atom to uranium 238 atom ratio is about 37.1:1.

In order to provide heat removal from the system, coolant 45 is arranged to flow past the fuel elements 24. It is desired that this coolant also be a good moderator, and for this purpose either ordinary or heavy water is acceptable. The coolant system includes an external surge tank, pump and heat exchanger (not shown) for circulating the water through the system and for cooling the water to the desired temperature prior to its delivery to the reactor tank 20. If one desires, one also may include a demineralizer (not shown) in the coolant system. The coolant is delivered through suitable inlet piping 38 downwardly adjacent the side of the reactor tank to a suitable inlet opening 46 at the bottom of the reactor tank. Suitable coolant passageways 47 are provided in the lower grid member 28 to permit coolant to flow upwardly into the lower section of the reactor tank containing the fuel elements 24. The lower ends of the fuel elements are preferably chamfered adjacent the shoulder portions, as indicated at 48, so as not to block the free flow of the coolant through the passageways 47. The upper portion of the fuel element immediately below the head portion 41 is suitably fluted, as indicated at 50, so as to permit the coolant to flow freely upwardly through the upper grid member 30. The coolant 45 fills the body of the reactor tank above the fuel elements 24 up to the height of an outlet opening 51 which leads to outlet piping 52 through which the coolant is drawn from the reactor tank.

The control and/or safety rods 14 used in the present reactor may be of any standard type, and do not form an essential part of the present invention. In the drawings there is illustrated a typical form of control and safety rod which is suitable for the present purposes. This control rod includes two elongated, movable, vertically aligned, interengageable members 53 and 54. The lower member 54 includes a lower portion formed of a closed stainless steel tube 55, containing a neutron capturing material such as boron carbide, which connects at its upper end to the lower end of a vertically extending stainless steel rod 56 which terminates in an enlarged head 57. The stainless steel head 57 is adapted to be engaged by an electromagnet (not shown) located at the lower end of the overlying, vertically aligned member 53.

Three pairs of aligned openings 58 and 60 in the grid members 28 and 30, respectively, are used for the insertion of the lower members 54 of the control rods 14 into the core portion of the reactor. Suitable perforated aluminum tubes 61 which permit coolant to pass freely through their walls, are provided for guiding the lower members 54 of the control rods into the core of the reactor. These aluminum tubes have lower ends of reduced diameter which fit snugly into the openings 58 provided in the lower grid members 28. Each of the guide tubes 61 extends upwardly through and above the upper grid member 30 and, as may be seen in FIGURE 3, has a uniform inner diameter from a point immediately above the lower grid member to its upper end and a stepped outer diameter which provides a shoulder 62 which fixedly secures the guide tube 61 in position in the reactor assembly. The lower end 63 of each of the members 54 is of a diameter such as to slidably engage the inner wall of a guide tube 61. In addition, a ring member 64 of a suitable diameter so as to engage the inner wall of the guide tube 61 is provided at a point intermediate the length of the lower member 54 so as to prevent wobbling of the control rod within the guide tube. To further stabilize the movement of the control rod members 54, stationary guide rings 65 which slidably engage the rods 56, extend into and are attached to the upper ends of the guide tubes 61.

Suitable mechanism (not shown) is provided outside the reactor body for controlling the movement of the upper control rod members 53 and the actuation of the electromagnets at the bottoms thereof. Each of the lower control rod members 54 may be raised by bringing the base of the associated upper control rod member 53 into contact with the head 57 of the lower member 54, actuating the electromagnet in the upper member 53 and then drawing the member 53 upwardly. If one desires to lower the control rod member 54 rapidly, one can cut off the current to the electromagnet, thereby permitting the member 54 to fall freely back into the core assembly. To prevent the lower ends of the members 54 from striking the bottom of the guide tubes 61 with excessive force, which might damage the lower end of the reactor, a common dashpot arrangement 66 is provided between the upper end of each of the guide tubes 61 and the head 57 of the associated lower control rod member 54.

The reflector 12 which surrounds the reactor core is formed of a plurality of graphite bricks 67. The reflector 12 is substantially cup shaped and of generally rectangular outer outline. The thickness of the graphite reflector may be on the order of 1½ to 2½ feet or more, depending on the size of the active core of the reactor and the degree of scattering required. Graphite is a good scattering material having a low neutron absorption cross section. Other materials such as beryllium, beryllium oxide, etc., may also be used.

It will be noted that one side of the graphite reflector extends horizontally beyond the distance required to provide a suitable reflector for the reactor core. This additional section of graphite, which may conveniently be square or rectangular in cross section, provides the thermal column 15 which terminates adjacent the face of the reactor. The thermal column is conveniently used for experimental and research purposes. Such thermal columns are well known in the art and require no further discussion.

Surrounding the main portion of the graphite reflector is the external shield 13 formed of concrete or other suitable material which prevents gamma and other penetrating radiation from escaping to the outside of the structure. The concrete shield 13 may be formed in any suitable way, for example, by pouring or from concrete blocks.

As illustrated in FIGURE 2, a removable concrete section 68 is used to shield the outer face of the thermal column 15 when the thermal column is not in use. Since the graphite of the thermal column absorbs gamma rays only to a slight extent, it may be desirable to include a layer 70 of lead on one face of the movable concrete shield 68 to further reduce the gamma radiation which escapes this portion of the reactor. The movable concrete shield 68 includes a smaller central removable section 71 so as to permit access to a limited area of the face of the thermal column 15, should this be desired. It may also be observed that the removable sections 68 and 71 of concrete shielding are arranged in suitably stepped fashion so that the gamma radiation will not leak through between the junctures of the abutting concrete sections.

The section of the reactor diametrically opposite to the thermal column is illustrated as being constructed of a plurality of concrete blocks 72 and a large removable concrete section 73. If an additional thermal column is desired at some later time for the reactor, the concrete blocks 72 may be removed and graphite bricks (not shown) added.

As seen in FIGURE 1, the reactor is approximately hexagonal in sectional outline, and, as previously indicated, includes suitable access ports 16 and through tubes 17 for experimental and irradiation purposes. Suitable plugs (not shown) are provided for closing off the mouth portions of the access ports and through tubes during operation of the reactor.

In a reactor such as that described, the prompt negative temperature coefficient of reactivity may be greater than about $7 \times 10^{-5}/°$ C., resulting primarily from contributions from the "fuel element expansion effect," the "warm neutron effect," the "leakage effect," and the "neutron Doppler effect." The contribution of the "fuel element expansion effect" to the temperature coefficient will generally be between about 1.0 and about $4.0 \times 10^{-5}/°$ C., the contribution of the "warm neutron effect" to the temperature coefficient will generally be between about 0.5 and about $3.0 \times 10^{-5}/°$ C., and the contribution of the "leakage effect" to the temperature coefficient will be between about 1.0 and about $4.0 \times 10^{-5}/°$ C. The contribution of the "neutron Doppler effect" to the temperature coefficient will depend upon the amount of resonance absorption in the core of the reactor. If the amount of resonance absorption is greater than about 3 percent, the contribution of the "neutron Doppler effect" to the temperature coefficient will generally be greater than about $1.0 \times 10^{-5}/°$ C.

The effect of resonance absorption on the "Doppler" contribution to the temperature coefficient is illustrated in FIGURE 7. In this figure, the resonance absorption and "Doppler" contribution to the temperature coefficient are calculated for various admixtures of $U^{238}$ and zirconium hydride in the fuel elements of the reactor. It may be seen that as the $H/U^{238}$ ratio (i.e., the number of atoms of hydrogen to the number of atoms of uranium 238 in the fuel) increases, both the resonance absorption and "Doppler" contribution to the temperature coefficient of reactivity decrease. If $Th^{232}$ is substituted for the $U^{238}$ similar curves result. However, in this case, the "Doppler" contribution to the temperature coefficient of reactivity is slightly less than that obtained with $U^{238}$, due mainly to the smaller contribution of the lower resonances in $Th^{232}$. From these curves it may be seen that the resonance absorption in the system should be greater than about 3 percent in order to obtain a "Doppler" contribution to the temperature coefficient of reactivity of greater than about $1.0 \times 10^{-5}/°$ C.

From the foregoing, it is apparent that various reactor physics parameters may be varied within wide limits by the designer, depending upon the purpose for which the reactor is intended to be employed, without departing from the scope of the present invention. For purposes of illustration, the design specifications of a 10 kw. reactor constructed in accordance with the present invention is set forth below.

Core geometry: A cylindrical array of 57 aluminum clad fuel elements arranged in concentric circles as follows—
    Center—one hole
    1st circle—diameter 3.2 in.—6 holes uniformly spaced
    2nd circle—diameter 6.3 in.—12 holes uniformly spaced
    3rd circle—diameter 9.4 in.—18 holes uniformly spaced
    4th circle—diameter 12.5 in.—24 holes uniformly spaced
    5th circle—diameter 15.6 in.—30 holes uniformly spaced Fuel element specification:
    Diameter—1.42 in.
    Length of active portion—14.0 in.
    Aluminum cladding thickness—.030 in.
    Weight of active portion—2250 grams
        Hydrogen—~1% by weight
        Zirconium—~91% by weight
        Uranium—~8% by weight
        Uranium enrichment—20% $U^{235}$
        Hydrogen atoms/zirconium atoms—~1.0
        Hydrogen atoms/uranium atoms—~37.1

Critical mass: 2.0 kg. of $U^{235}$
Reflector: 1.5 ft. of graphite
Cooling: By forced flow of water between the fuel elements in an upward direction. At 10 kw. power, the design flow rate is 20 gals. per minute, inlet temperature 40° C., outlet temperature 42° C.
Water volume in the core—35 percent
Aluminum in the core—8 percent
Shielding: 5 ft. of concrete or 5½ ft. of water and 1 ft. of lead
Controls: 3 control rods (steel tubes containing boron carbide)

This reactor has a thermal flux of about $7 \times 10^{10}$ neutrons per square centimeter per second at 10 kw. at a point in the graphite reflector about 8 cm. from the edge of the core and an average core thermal flux of about $1 \times 10^{11}$ neutrons per square centimeter per second. The fast neutron flux at the core reflector interface is about $3 \times 10^{11}$ neutrons per square centimeter per second.

The excess reactivity of the reactor is above 1% and the prompt negative temperature coefficient of reactivity is about $7 \times 10^{-5}/°$ C. The large negative temperature coefficient of reactivity results from a "fuel element expansion" contribution of about $2.0 \times 10^{-5}/°$ C., a "warm neutron" contribution of about $1 \times 10^{-5}/°$ C., a "leakage" contribution of about $2 \times 10^{-5}/°$ C., and a "neutron Doppler" contribution of about $2 \times 10^{-5}/°$ C. A temperature increases of about 60° C. will therefore produce a drop in reactivity of about .004. Thus, if 0.4% excess reactivity is suddenly added to this reactor the temperature of the core will rise from about 40° C. to about 100° C. at which point the excess reactivity added to the system will be fully counterbalanced by a corresponding drop in reactivity due to the high negative temperature coefficient. If the rate of cooling of the reactor is neglected, the temperature of the fuel will "over shoot" to approximately 160° C., at which temperature the reactor will be distinctly subcritical. In a reactor which is being cooled during the excursion, the peak temperature will of course be considerably less than 160° C.

If a greater amount of excess reactivity is added to the system, for example, if all of the available reactivity (about 1%) is suddenly added, the temperature of the core will rise to a value less than 240° C. In this case, water will be suddenly ejected from the core in addition to the counterbalancing of the reactivity in the system. Since the fuel elements are designed to withstand a temperature of about 300° C. they will be unaffected by the sudden ejection of water from the core. Tests indicate that ejection of water from the core will not lead to damage of the reactor as long as the maximum fuel temperature does not exceed 300° C.

A further increase in the high prompt negative temperature coefficient of reactivity may be obtained in the present reactor by adding a predetermined amount of suitable "poison" to the system. The "poison" should be such that the relative absorption of neutrons by the high neutron capturing material relative to the absorption of neutrons by the fissionable material increases with the temperature of the fuel. The addition of "poisons" to the reactor results in the absorption of neutrons. This neutron loss, however, is comparable to or less than the neutron loss resulting from the presence of uranium 238 or natural leakage sufficient to produce the same temperature coefficient for the reactor. The material used as a "poison" can vary widely and may be either a material which has a constant or increasing absorption cross section up to a temperature over about 300° C., such as samarium or cadmium, or a "black poison" such as a suitable thickness of boral (a boron carbide-aluminum mixture) which is essential opaque to neutrons. The "poison" may be added either directly to the fuel element or may be located externally of the fuel element, such as at the inner face of the reflector, as desired.

For example, in a reactor such as has just been described, "black poison" is conveniently added by adding compressed boral in the form of discs .40 in. in diameter x .10 in. in thickness in the center and at each end of each fuel element (this is illustrated in dotted outline at 74 in one of the fuel elements of FIGURE 3). This will give a total capture probability in the "poison" of around 10% and give an added contribution to the negative temperature coefficient of reactivity of about $1.0 \times 10^{-4}/°$ C. or greater. The addition of this amount of "black poison" will require an increase in critical mass of about 30% or the addition of about eighteen fuel elements to the core.

This application is a continuation-in-part of application Serial No. 664,706, filed June 10, 1957, now abandoned.

The various features of the invention which are believed to be new are set forth in the following claims.

We claim:

1. A neutronic reactor comprising a vertically extending reactor tank, a quantity of fluid coolant in said reactor tank, an inlet opening in said tank adjacent the bottom thereof for delivering coolant to said tank, an outlet opening in the side of said tank adjacent the upper end thereof for removing coolant from said tank and for maintaining a constant level of coolant in said tank, vertically spaced upper and lower grid members extending transversely across the lower end portion of said tank with the lower grid member positioned above said inlet opening, a plurality of vertically extending removable aluminum tubes having a body portion defining a generally uniform cross-sectional area and shape and a lower end defining a reduced cross-sectional area supported vertically within said tank in a predetermined spaced relation to each other by said grid members, said grid members being provided with vertical aligned openings, the aligned openings in said upper grid member being of such size as to slidably accommodate the body portion of said tubes and the aligned openings in the lower grid member being of such size as to slidably accommodate the reduced cross-sectional area portions of said tubes, said lower grid member also including additional spaced openings for permitting the coolant to flow freely past said lower grid member, most of said aluminum tubes extending only a short distance above said upper grid member and having an upper end portion shaped so as to be engageable by the end portion of a coacting elongated pickup member for removing said tubes from said tank, at least a major portion of said engageable tubes containing a homogeneous mixture of a solid moderator and a material fissionable by neutrons of thermal energy which constitutes the fuel for said reactor, said fuel containing tubes being fluted adjacent the portions engaged by said upper grid member when the fuel elements are in position within said tank to permit the coolant to flow freely past said upper grid member, and the remainder of said aluminum tubes extending above said upper grid member and containing vertically movable members actuated from the top of said reactor, said vertically movable members including neutron absorbing material for controlling the operation of said reactor.

2. A neutronic reactor having a high prompt negative temperature coefficient of reactivity, comprising a reactor tank, a quantity of water in said reactor tank which serves both as a coolant and a moderator, an active core within the water in said tank, said active core including a plurality of fluid tight elongated tubes, each of said tubes containing a solid homogeneous mixture of zirconium hydride and uranium, the uranium in said mixture being a mixture of about 20 percent uranium 235 and the remainder uranium 238, the ratio of the number of hydrogen atoms to the number of uranium 235 atoms being approximately 150 to 1, said tubes being spaced within said tank to provide passageways surrounding each of said tubes, and means for flowing said water through said passageways in heat exchange relationship with said tubes.

3. A fuel element for a neutronic reactor, comprising a fluid tight, elongated tube containing a reactive portion formed of a solid homogeneous mixture of zirconium hydride and uranium, the uranium in said mixture being a mixture of about 20 percent uranium 235 and the remainder uranium 238, the ratio of the number of hydrogen atoms to the number of uranium 235 atoms being approximately 150 to 1, the ratio of hydrogen atoms to zirconium atoms being approximately 1 to 1, and a body of reflecting material at one end of the tube.

4. A neutronic reactor having a high, prompt negative temperature coefficient of reactivity, comprising a reactor tank, a quantity of water in said reactor tank which serves both as a coolant and a moderator, an active core within the water in said tank, said active core including a plurality of fluid-tight, elongated tubes, each of said tubes containing a solid, homogeneous mixture of zirconium hydride and enriched uranium, a major proportion by weight of said uranium being uranium 238, said zirconium hydride comprising a major proportion by weight of the mixture with the ratio of hydrogen atoms to zirconium atoms being at least approximately 1 to 1, said tubes being spaced within said tank to provide passageways surrounding each of said tubes, and means for causing water to flow in said passageways in heat exchange relationship with said tubes.

5. A neutronic reactor having a high, prompt negative temperature coefficient of reactivity, comprising a reactor tank, a quantity of water in said reactor tank which serves both as a coolant and a moderator, an active core within the water in said tank, said active core including a plurality of fluid-tight, elongated tubes, each of said tubes containing a solid, homogeneous mixture of zirconium hydride and enriched uranium, a material having a high neutron capture cross section distributed within the fuel element, a major proportion by weight of said uranium being uranium 238, said zirconium hydride comprising a major proportion by weight of the mixture with the ratio of hydrogen atoms to zirconium atoms being at least approximately 1 to 1, said tubes being spaced within said tank to provide passageways surrounding each of said tubes, and means for causing water to flow in said passageways in heat exchange relationship with said tubes.

6. A neutronic reactor comprising a vertically extending reactor tank, a quantity of fluid coolant in said reactor tank, vertically spaced upper and lower grid members extending transversely across the lower end portion of said tank with the lower grid member positioned above the bottom of said tank, a plurality of vertically extending removable tubes having a body portion of a generally uniform cross-sectional area and shape and a lower end portion of reduced cross-sectional area supported vertically within said tank in a predetermined spaced relation to each other by said grid members, said grid members being provided with vertically aligned openings, the aligned openings in said upper grid member being of such size as to slidably accommodate the body portion of said tubes and the aligned openings in the lower grid member being of such size as to slidably accommodate the lower end portions of said tubes, means defining openings in said lower grid member for permitting the coolant to flow freely past said lower grid member, said tubes extending only a short distance above said upper grid member and having an upper end portion shaped so as to be engageable by the end portion of a coacting pickup member for removing said tubes from said tank, said tubes containing a homogeneous mixture of a solid moderator and a material fissionable by neutrons of thermal energy which constitutes the fuel for said reactor, means defining openings in said upper grid member when the fuel elements are in position within the tank to permit the coolant to flow freely past said upper grid member, and means for causing the coolant to flow through said openings in the lower grid member, along said tubes, and then through said openings in the upper grid member.

References Cited in the file of this patent

UNITED STATES PATENTS

| | | |
|---|---|---|
| 2,807,082 | Zambrow et al. | Sept. 24, 1957 |
| 2,812,303 | Daniels | Nov. 5, 1957 |
| 2,929,707 | Weeks et al. | Mar. 22, 1960 |

FOREIGN PATENTS

| | | |
|---|---|---|
| 614,156 | Great Britain | Dec. 10, 1948 |
| 648,293 | Great Britain | Jan. 3, 1951 |

OTHER REFERENCES

Stelle: "Science," vol. 119, pp. 15–21, January 1, 1954.

Zinn: "International Conference on the Peaceful Uses of Atomic Energy," vol. 2, pp. 456–461, August 1955, United Nations Publications, N.Y.

McCullough et al.: "Nucleonics," November 1956, pages 146–153.

UNITED STATES PATENT OFFICE
CERTIFICATE OF CORRECTION

Patent No. 3,127,325                March 31, 1964

Theodore Brewster Taylor et al.

It is hereby certified that error appears in the above numbered patent requiring correction and that the said Letters Patent should read as corrected below.

Column 10, line 52, after "uranium" insert -- 238 --; column 11, line 6, for "increases" read -- increase --; line 50, for "essential" read -- essentially --.

Signed and sealed this 28th day of July 1964.

(SEAL)

Attest:

ESTON G. JOHNSON                EDWARD J. BRENNER
Attesting Officer                Commissioner of Patents